(12) United States Patent
Port et al.

(10) Patent No.: US 9,803,616 B2
(45) Date of Patent: Oct. 31, 2017

(54) WIND TURBINE HAVING A PLURALITY OF AIRFOIL RINGS AND COUNTER ROTATING GENERATORS

(71) Applicants: Ryan Port, Apple Valley, MN (US); Laurance Jay Scheib, Bloomsburg, PA (US)

(72) Inventors: Ryan Port, Apple Valley, MN (US); Laurance Jay Scheib, Bloomsburg, PA (US)

(*) Notice: Subject to any disclaimer, the term of this patent is extended or adjusted under 35 U.S.C. 154(b) by 694 days.

(21) Appl. No.: 14/170,563

(22) Filed: Jan. 31, 2014

(65) Prior Publication Data
US 2015/0219068 A1    Aug. 6, 2015

(51) Int. Cl.
*F03D 1/02* (2006.01)
*F03D 7/02* (2006.01)

(52) U.S. Cl.
CPC ........... *F03D 1/025* (2013.01); *F03D 7/0224* (2013.01); *F05B 2240/14* (2013.01); *F05B 2240/33* (2013.01); *Y02B 10/30* (2013.01); *Y02E 10/723* (2013.01); *Y02E 10/725* (2013.01)

(58) Field of Classification Search
CPC .... F03D 7/0024; F03D 1/025; F05B 2240/14; F05B 2240/33
See application file for complete search history.

(56) References Cited

U.S. PATENT DOCUMENTS

| | | | | |
|---|---|---|---|---|
| 1,982,039 A | * | 11/1934 | Youngberg | F03D 7/0224 416/146 A |
| 2,096,860 A | * | 10/1937 | Renquist | F03D 7/0224 416/136 |
| 2,177,801 A | * | 10/1939 | Erren | H02K 7/1838 290/55 |
| 3,974,396 A | * | 8/1976 | Schonball | F03D 1/025 290/54 |
| 4,065,225 A | * | 12/1977 | Allison | F03D 1/025 416/11 |
| 4,330,714 A | | 5/1982 | Smith | |
| 5,286,166 A | * | 2/1994 | Steward | B63H 3/008 416/136 |

(Continued)

FOREIGN PATENT DOCUMENTS

| | | | | |
|---|---|---|---|---|
| EP | 2463523 | | 6/2012 | |
| FR | 549354 | A * | 2/1923 | ............. F03D 1/025 |

OTHER PUBLICATIONS

Wind Energy, http://fuellogicnnovations.com/wind-energy.

*Primary Examiner* — Jacob Cigna

(74) *Attorney, Agent, or Firm* — Doster Greene, LLC

(57) ABSTRACT

A wind turbine can include a first rotating ring and a second rotating ring. A first plurality of airfoils is pivotally secured between an interior rim and an exterior rim of the first rotating ring and disposed at a first angle of attack. A second plurality of airfoils is pivotally secured between an interior rim and an exterior rim of the second rotating ring and disposed at a second angle of attack. A generator is mounted between the first rotating ring and the second rotating ring and generates electricity in response to the first plurality of airfoils capturing the wind with the first angle of attack such that the first rotating ring rotates in a first direction and the second plurality of airfoils captures the wind with the second angle of attack such that the second rotating rings rotate in an opposite direction from the first rotating ring.

54 Claims, 9 Drawing Sheets

(56) References Cited

U.S. PATENT DOCUMENTS

| | | | |
|---|---|---|---|
| 5,506,453 A * | 4/1996 | McCombs | F03D 1/025 |
| | | | 290/44 |
| 6,966,747 B2 | 11/2005 | Taylor et al. | |
| 7,186,083 B2 * | 3/2007 | Bayly | F03D 7/0248 |
| | | | 290/1 B |
| 7,902,688 B2 | 3/2011 | Krivcov et al. | |
| 8,272,840 B2 | 9/2012 | Yan | |
| 2006/0093482 A1 * | 5/2006 | Wacinski | F03D 1/025 |
| | | | 416/128 |
| 2006/0163963 A1 * | 7/2006 | Flores, Jr. | F03D 1/025 |
| | | | 310/115 |
| 2010/0090468 A1 * | 4/2010 | Hong | F03D 1/025 |
| | | | 290/55 |
| 2010/0225190 A1 * | 9/2010 | Huang | F03D 1/02 |
| | | | 310/115 |
| 2011/0038728 A1 * | 2/2011 | Elkin | F03D 1/025 |
| | | | 416/31 |
| 2011/0272951 A1 | 11/2011 | Marchand | |
| 2012/0243990 A1 | 9/2012 | Kosch | |
| 2013/0315732 A1 * | 11/2013 | Sutz | F03D 1/025 |
| | | | 416/9 |
| 2014/0008915 A1 * | 1/2014 | Ribarov | F03D 9/002 |
| | | | 290/55 |
| 2014/0271183 A1 * | 9/2014 | Barber | F03D 7/0224 |
| | | | 416/1 |
| 2014/0361543 A1 * | 12/2014 | Miro | F03D 9/002 |
| | | | 290/55 |

\* cited by examiner

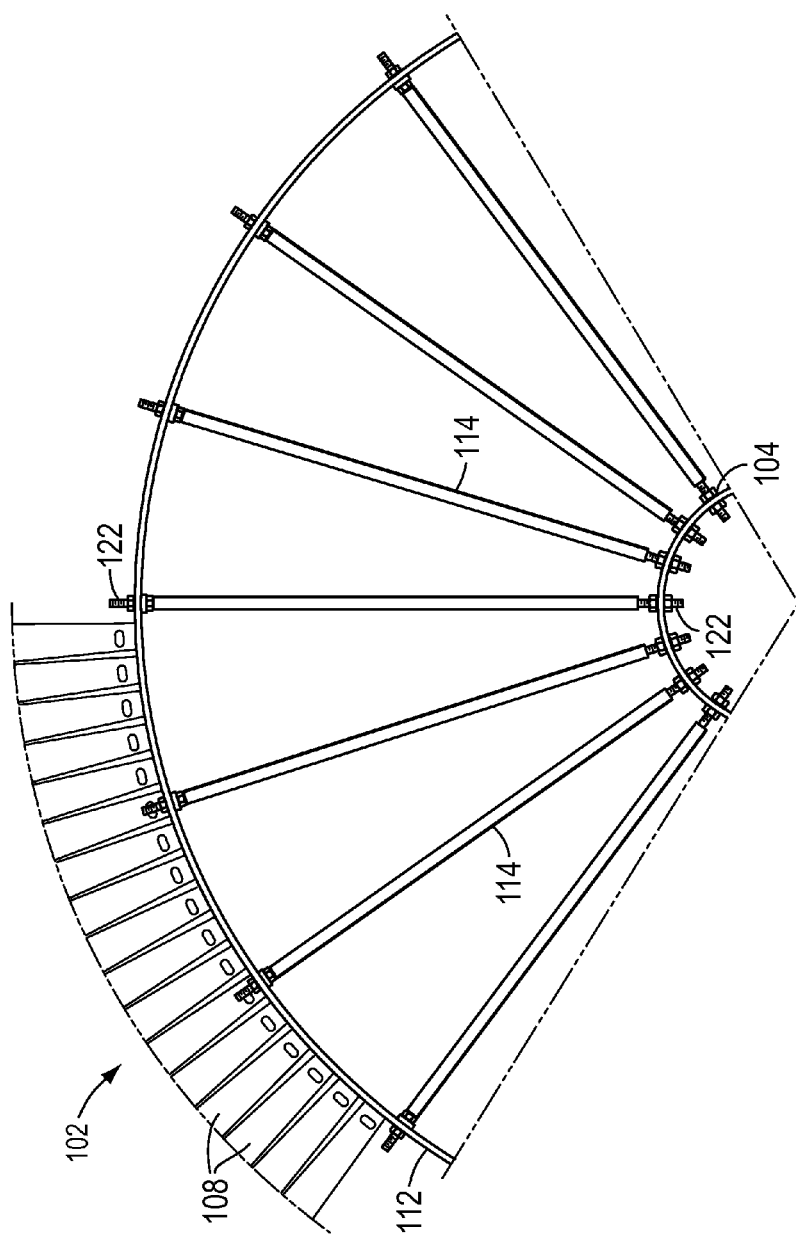

WIND TURBINE HAVING A PLURALITY OF AIRFOIL RINGS AND COUNTER ROTATING GENERATORS

I. FIELD OF THE INVENTION

The present disclosure relates generally to electrical energy producing devices, and, in particular, relates to electrical energy producing devices that extract energy from the wind. More particularly, the present disclosure relates to a wind turbine system having an easily customizable design that is capable of exploiting different wind characteristics at various locations.

II. BACKGROUND OF THE INVENTION

Wind turbines harness the power of the wind and turn it into electricity via a generator. Wind turbines can be used to produce electricity for a single home or building, or they can be connected to an electricity grid for more widespread electricity distribution. In recent years, as the price of fossil fuel increases and the supply decreases, the demand for wind energy has increased and wind turbines have grown in numbers.

Wind turbines operate on a simple principle that converts wind energy to electricity for distribution. In conventional wind turbines, the energy in the wind turns the blades around a rotor. The rotor is connected to the main shaft, which spins a generator to create electricity. Thus, wind turbines convert the kinetic energy in the wind into mechanical power. This mechanical power can be used for specific tasks (such as grinding grain or pumping water using a pump) or a generator can convert this mechanical power into electricity.

Wind turbines are designed to exploit the wind energy that exists at a location. Wind flow patterns and speeds vary greatly across the United States and are modified by bodies of water, vegetation, and differences in terrain. Wind turbines have been erected at various locations. Typically, wind turbines are mounted on a tower to take advantage of faster and less turbulent wind and to capture the most energy. Thus, aerodynamic modeling is used to determine the optimum tower height, control systems, number of blades and blade shape. However, the designs of some conventional wind turbines are relatively complex.

Thus, there is a general need to provide a more efficient and better operating wind turbine system. There is also a need for a wind turbine system and method that permit custom applications based on the wind characteristics of the wind available at a particular location. There is a further need for a wind turbine system where the parts of the structure are inexpensive, lightweight, durable, easily manufacturable, and capable of handling variable loading and environmental conditions. There also remains a need for wind turbine systems that require less maintenance, are lighter and last longer, and have fewer failures. Such a wind turbine system will be relatively efficient, simple in terms of design and implementation and cost effective.

III. SUMMARY OF THE INVENTION

The present invention may satisfy one or more of the above-mentioned desirable features. Other features and/or advantages may become apparent from the description which follows.

In at least one aspect, the present disclosure provides a wind turbine according to various embodiments that can include a first rotating ring and a second rotating ring. The first rotating ring may include a first interior rim and a first exterior rim. A first plurality of airfoils may be pivotally secured between the first interior rim and the first exterior rim and disposed at a first angle of attack. A second rotating ring may include a second interior rim and a second exterior rim. A second plurality of airfoils may be pivotally secured between the second interior rim and the second exterior rim and disposed at a second angle of attack. A generator may be mounted between the first rotating ring and the second rotating ring and may generate electricity in response to the first plurality of airfoils capturing the wind with the first angle of attack such that the first rotating ring rotates in a first direction and the second plurality of airfoils capturing the wind with the second angle of attack such that the second rotating rings rotate in an opposite direction from the first rotating ring.

In at least another aspect, the present disclosure provides a wind turbine according to various embodiments that can include a wind turbine having a housing coupled to a support structure. The housing may be divided into sections including a first hub, a second hub, and a nacelle interdisposed between the first hub and the second hub. A plurality of rotating rings may be mounted to the housing and configured to provide uniform load distribution on the support structure. At least one of a first pair of rotating rings may be rotatably mounted along the first hub and at least one of a second pair of rotating rings may be rotatably mounted along the second hub. Each of the at least one of the first pair and the second pair or rotating rings may include a first rotating ring and a second rotating ring. A first plurality of airfoils may be pivotally secured to the first rotating rings and disposed at a first angle of attack. A second plurality of airfoils may be pivotally secured to the second rotating rings and disposed at a second angle of attack. A pair of counter rotating generators may be mounted to the housing and configured to provide uniform load distribution on the support structure. A first generator may be mounted to the first hub between the at least one first pair of rotating rings and may generate electricity in response to the first plurality of airfoils of the at least one first pair of rotating rings capturing the wind with the first angle of attack such that the first rotating ring of the at least one first pair of rotating rings rotate in a first direction and the second plurality of airfoils of the at least one first pair of the rotating rings capturing the wind with the second angle of attack such that the second rotating ring of the at least one first pair of the rotating rings rotate in an opposite direction from the first rotating ring. A second generator may be mounted to the second hub between the at least one second pair or rotating rings and may generate electricity in response to the first plurality of airfoils of the at least one second pair of rotating rings capturing the wind with the first angle of attack such that the first rotating ring of the at least one second pair of rotating rings rotate in the first direction and the second plurality of airfoils of the at least one second pair of the rotating rings capturing the wind with the second angle of attack such that the second rotating ring of the at least one second pair of the rotating rings rotate in the opposite direction from the first rotating ring.

In yet another aspect, the present disclosure provides a method of generating electricity with a wind turbine according to various exemplary embodiments can include rotating a first rotating ring having a first interior rim and a first exterior rim, wherein a first plurality of airfoils is pivotally secured between the first interior rim and the first exterior rim and disposed at a first angle of attack; rotating a second rotating ring having a second interior rim and a second exterior rim, wherein a second plurality of airfoils is pivotally secured between the second interior rim and the second exterior rim and disposed at a second angle of attack; and generating electricity, using a generator mounted between the first rotating ring and the second rotating ring, in response to the first plurality of airfoils capturing the wind with the first angle of attack such that the first rotating ring rotates in a first direction and the second plurality of airfoils capturing the wind with the second angle of attack such that the second rotating rings rotate in an opposite direction from the first rotating ring.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

IV. BRIEF DESCRIPTION OF THE DRAWINGS

FIG. 5B depicts a front view of spokes attached to a rotating ring and a hub in accordance with an embodiment of the present teachings;

Figure 1:
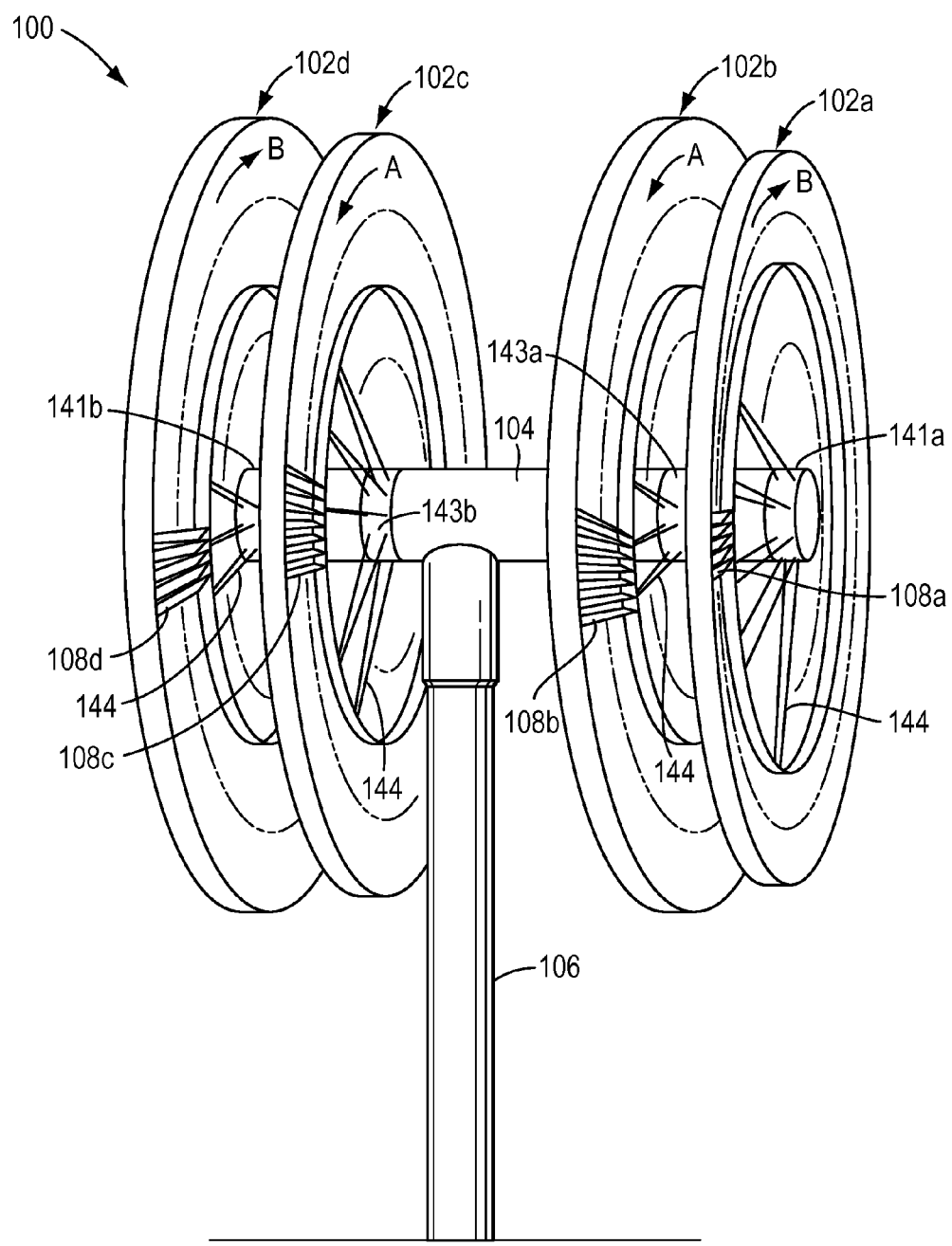
FIG. 1 illustrates a perspective view of a wind turbine system in accordance with the present teachings.

The present disclosure may take form in various components and arrangements of components, and in various process operations and arrangements of process operations. The present disclosure is illustrated in the accompanying drawings, throughout which, like reference numerals may indicate corresponding or similar parts in the various figures. The drawings are only for purposes of illustrating preferred embodiments and are not to be construed as limiting the disclosure. Given the following enabling description of the drawings, the novel aspects of the present disclosure should become evident to a person of ordinary skill in the art.

V. DETAILED DESCRIPTION

The following detailed description is merely exemplary in nature and is not intended to limit the applications and uses disclosed herein. Further, there is no intention to be bound by any theory presented in the preceding background or summary or the following detailed description. While embodiments of the present technology are described herein primarily in connection with wind turbines, the concepts are also applicable to other types of electrical energy producing devices.

Various embodiments of the wind turbine system described herein provide a design that is customizable based on the wind characteristics at a location. The customization of the design is enabled by one or more features provided in the various embodiments, such as a pair of counter rotating generators, spring-loaded airfoils, and braking capabilities implemented without the addition of an electronic controlled braking system. Rather than using blades found in many conventional devices, various embodiments of the wind turbine system employ airfoils that can be custom designed by making slight design changes to the shape of the airfoil, which will in turn affect the lift. As it is generally known, when the wind blows, the flow of the air around the airfoil creates an aerodynamic force, which turns the rotor around its axis and drives the generator to produce electric energy. This aerodynamic force comprises a lift component and a drag component. The airfoil produces a lifting force that acts at right angles to the airstream and a dragging force that acts in the same direction as the airstream. The lift of an airfoil is primarily the result of its angle of attack and shaped surface. The angle of attack is the angle at which the relative wind strikes the airfoil. The airfoil provides lift by causing air to pass at a higher speed over the airfoil than below it, resulting in greater pressure below than above. The airfoils create different lift and drag forces at various angles of attack.

By using airfoils, the wind turbine system of the present teachings is easily customizable to different wind characteristics at various locations. In various embodiments, electricity generation from a wide variety of wind patterns may be accomplished using substantially the same device since virtually unlimited numbers of shapes of the one or more airfoils can be designed to meet the specific wind characteristics of a particular location. Different airfoils can be designed to customize the wind turbine to the typical wind patterns of a location. For example, a 50 foot turbine installed in the wind belt of Buffalo Ridge, Minn. would have a different combination of airfoil and spring design, than an installation in Bloomsburg, Pa.

In various embodiments, the airfoils are located on the outside 25% of the diameter of each rotating ring. This configuration maximizes the torque produced on the center hub while minimizing the total weight of the wind turbine and reducing the wind speed of the entire system. The design of the airfoil enables the lift created at low wind speeds to be maximized and the wind at high speeds to be dumped. To dump wind is to allow wind to pass through an airfoil without producing any additional lift. In various embodiments, this may be accomplished by spring loading the airfoils to change the angle of attack as the wind speed increases.

Furthermore, due to the combination of the airfoil and spring design, the wind turbine needs no electronic controllers or electronic devices to shut down the turbine during high wind events. With the spring-loaded airfoils, when a high wind event occurs, the airfoils will open, which will have the effect of not increasing the revolutions per minutes (RPMs).

Various embodiments of the wind turbine system provide a pair of counter rotating rings positioned on both sides of the nacelle to provide uniform load distribution on the pole of the system. In order to balance the weight exerted on the pole, the system provides, for example, a four ring configuration comprising a first pair of rotating rings that spin a first generator on one side of the nacelle and a second pair of rings that spin a second generator on the opposite side of the nacelle. Thus, in various embodiments, the wind turbine system is configured to include a total of four counter rotating rings that counter rotate two generators, respectively, positioned on top of the pole of the system during operation.

Because the counter rotating design of the wind turbine system is uniform, as wind encounters the wind turbine, the z-axis torque or twisting torque on the pole can be neutralized by properly balancing the energy absorbed by the wind turbine. For example, the system design is uniform, similar to a jet engine, rather than a propeller design. Typically, such a counter rotating design is not a feasible design for inclusion into non-uniform turbines, such as wind turbine designs that include the propeller design. Most likely, a counter rotating design would not be implemented within a propeller system, because the propeller design is not uniform in the distribution of the load and it produces vibrations when multiple propellers are employed in such a design.

Furthermore, various embodiments of the wind turbine system described herein provide a more efficient, utility scalable wind turbine. Various embodiments of the wind turbine enable the generation of electricity. Various embodiments can also be used for pumping fluids using a pump.

Figure 2:
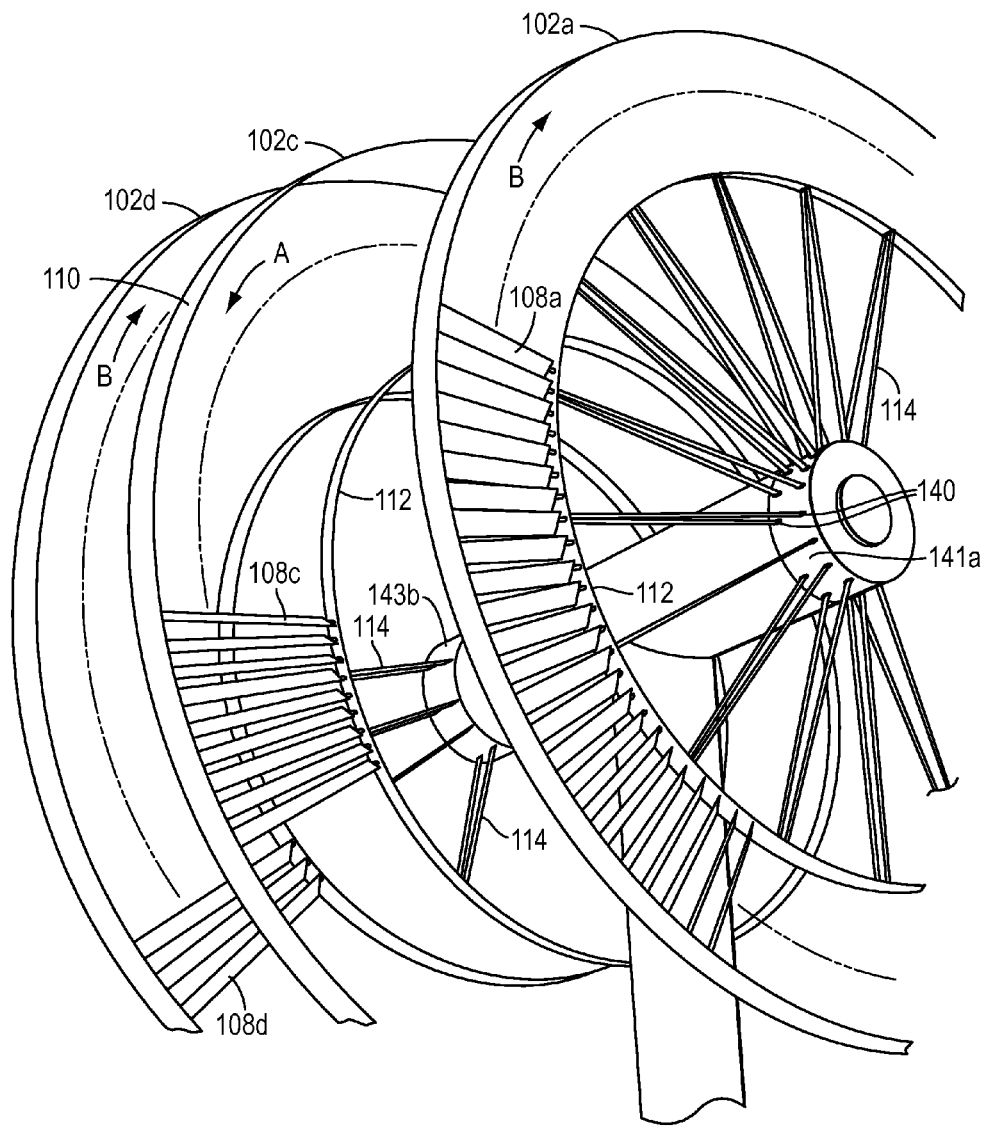
FIG. 2 illustrates a perspective view of a wind turbine system in accordance with the present teachings.

An exemplary embodiment of a wind turbine device 100 that can be used, for example, to convert kinetic wind energy into useful electric energy is illustrated in FIGS. 1-2. As best shown in FIG. 1, the wind turbine 100 can be mounted upon a support structure, such as a substantially rigid pole 106, in a location having a sufficient wind to provide electrical power to a power grid (not shown). Those skilled in the art would recognize that a number of wind turbines 100 may be co-located to provide a wind energy farm.

Figure 3:
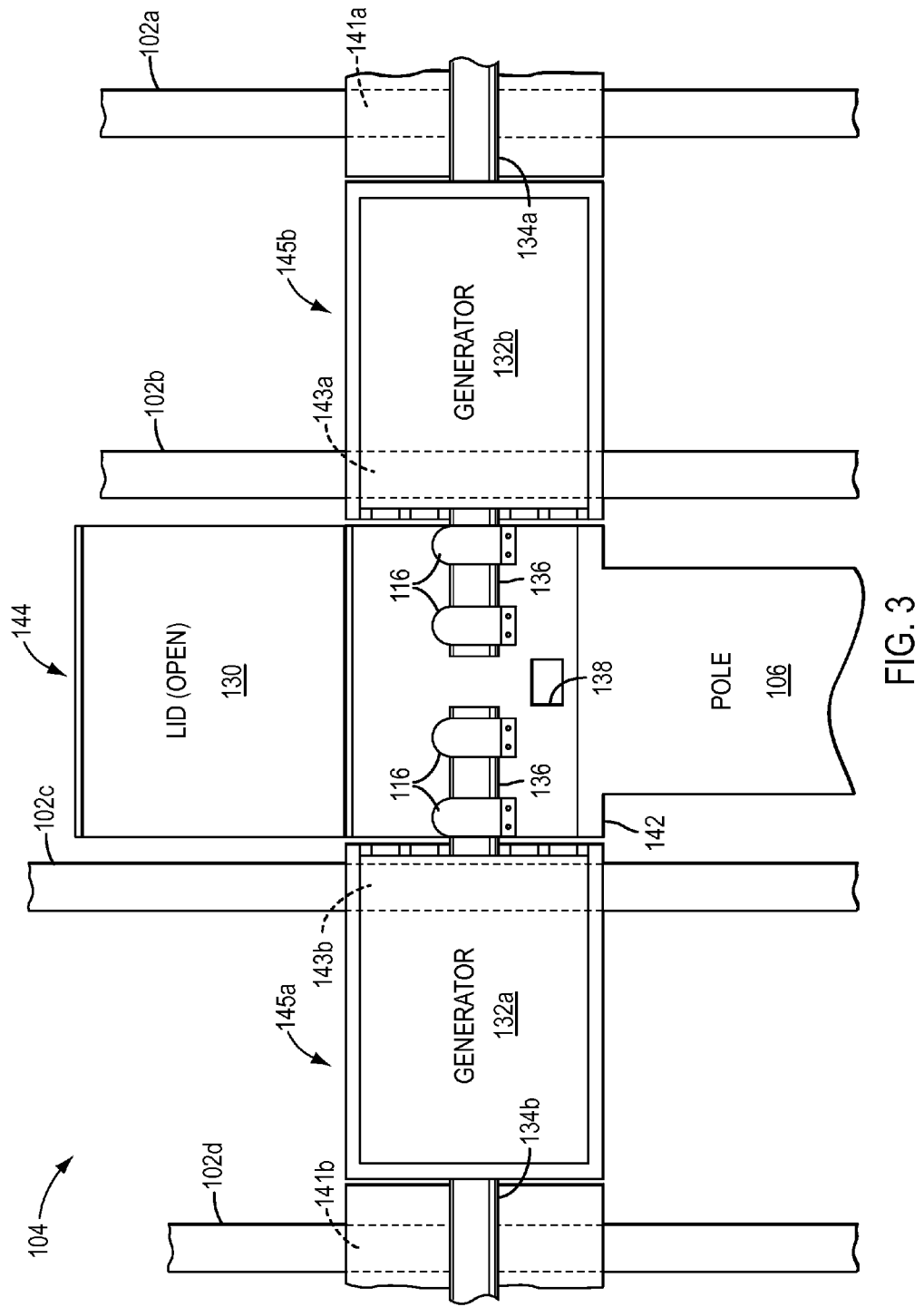
FIG. 3 illustrates components contained within a nacelle in accordance with an embodiment of the present teachings.

The wind turbine 100 may have a housing 104 coupled to the support structure or pole 106. As shown in FIGS. 1 and 3, the housing 104 may be divided into sections to include a first hub 145a, a nacelle 144, and a second hub 145b. A plurality of rings 102a, 102b, 102c, and 102d may be rotatably mounted to respective locations along the hubs 145a and 145b of the housing 104. The plurality of rotating rings 102a, 102b, 102c, and 102d may be configured to rotate in a vertical plane about a horizontal axis of the housing 104 such that the size of the rotating rings successively increases or decreases from one end of the wind turbine to the other end. For example, in FIG. 1, the diameter of each rotating ring successively increases from the rotating ring 102a to rotating ring 102b to rotating ring 102c and to rotating ring 102d. Namely, in the example shown in FIG. 1, the diameter of rotating ring 102b is larger than rotating ring 102a, the diameter of rotating ring 102c is larger than the rotating ring 102b, and the diameter of the rotating ring 102d is larger than rotating ring 102c.

In lieu of successively increasing or decreasing the size of the rotating rings, in some exemplary embodiments, the rotating rings may be uniform, for example, having substantially the same size, shape, and other characteristic features. In other embodiments, at least one of the rotating rings may have a size, shape, and other configuration that differs from the other rotating rings.

As shown in FIG. 1, each ring 102a, 102b, 102c, 102d may include a plurality of airfoils 108a, 108b, 108c, 108d, respectively. In FIG. 2, ring 102b shown in FIG. 1 has been omitted from this view for clarity, but would normally be provided in the wind turbine 100 to provide a uniform configuration. The airfoils 108a and 108d in rings 102a and 102d, respectively, may be similar to the airfoils 108b and 108c in rings 102b and 102c, but with the airfoils positioned in opposite directions. Thus, during operation, airfoils 108b and 108c of the rotating rings 102b and 102c, respectively, captures the wind with an angle of attack and rotates the rings 102b and 102c in a first direction, shown with arrow A. Similarly, during operation, the airfoils 108a and 108d of the rotating rings 102a and 102d, respectively, capture the wind with an angle of attack such that rings 102a and 102d rotate in an opposite direction, shown with arrow B. In lieu of the airfoils being positioned in opposite directions, in some embodiments, all or some of the airfoils of the different rotating rings may be positioned in the same directions or varying directions with the same or differing angles of attack.

As shown in FIG. 3, the housing 104 may be configured to include the nacelle 144 positioned between dual hubs 145a and 145b. A pair of counter rotating generators 132a, 132b may be mounted in the hubs 145a and 145b, respectively. The hub may be divided into two sections 145a, 145b to house the two counter rotating generators 132a and 132b such that a pair of counter rotating rings is positioned on both sides of the nacelle 144.

Figure 4A:
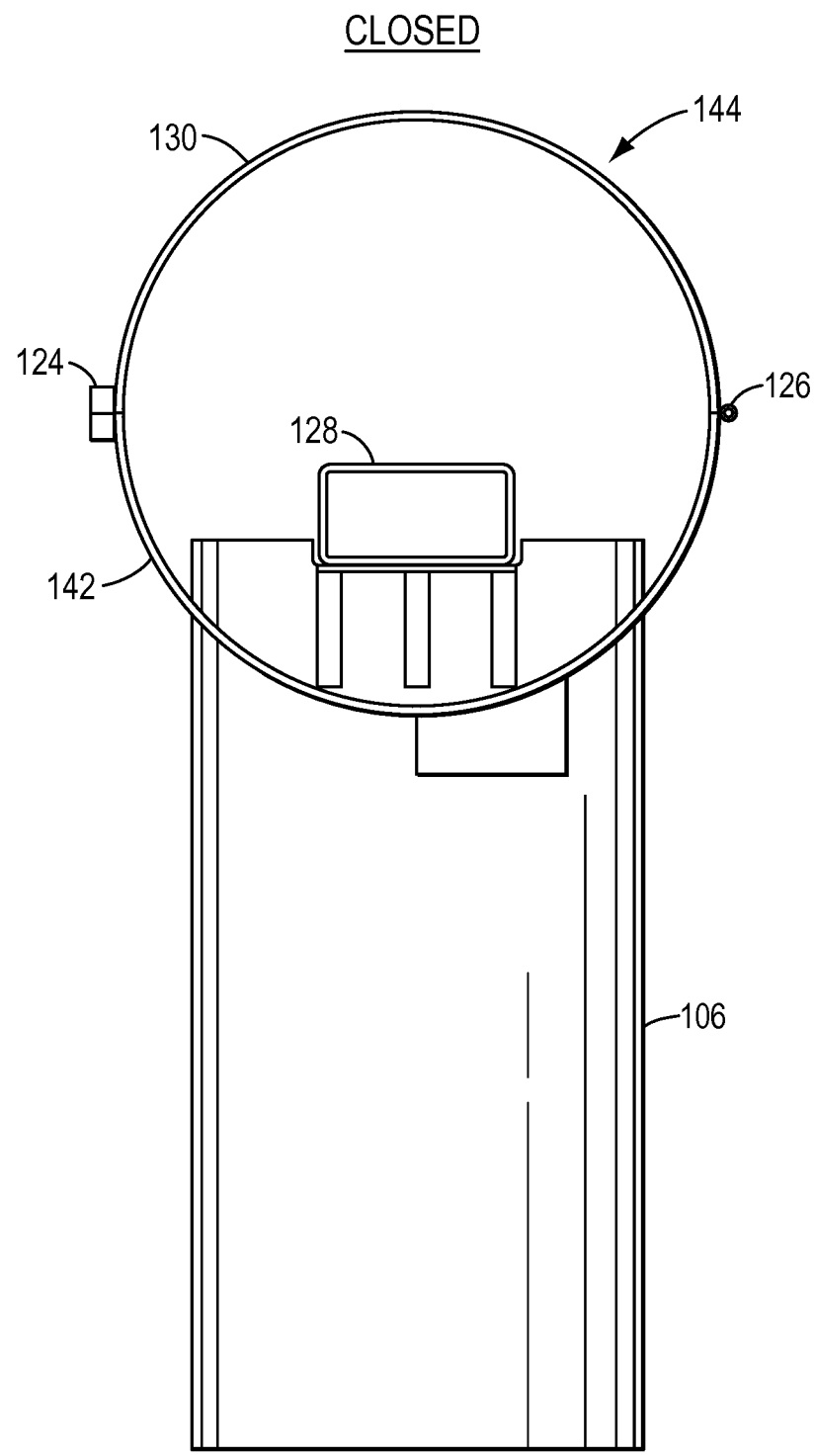
FIGS. 4A-4B illustrate front views of the nacelle housing in a closed and open position in accordance with embodiments of the present teachings
Figure 4B:
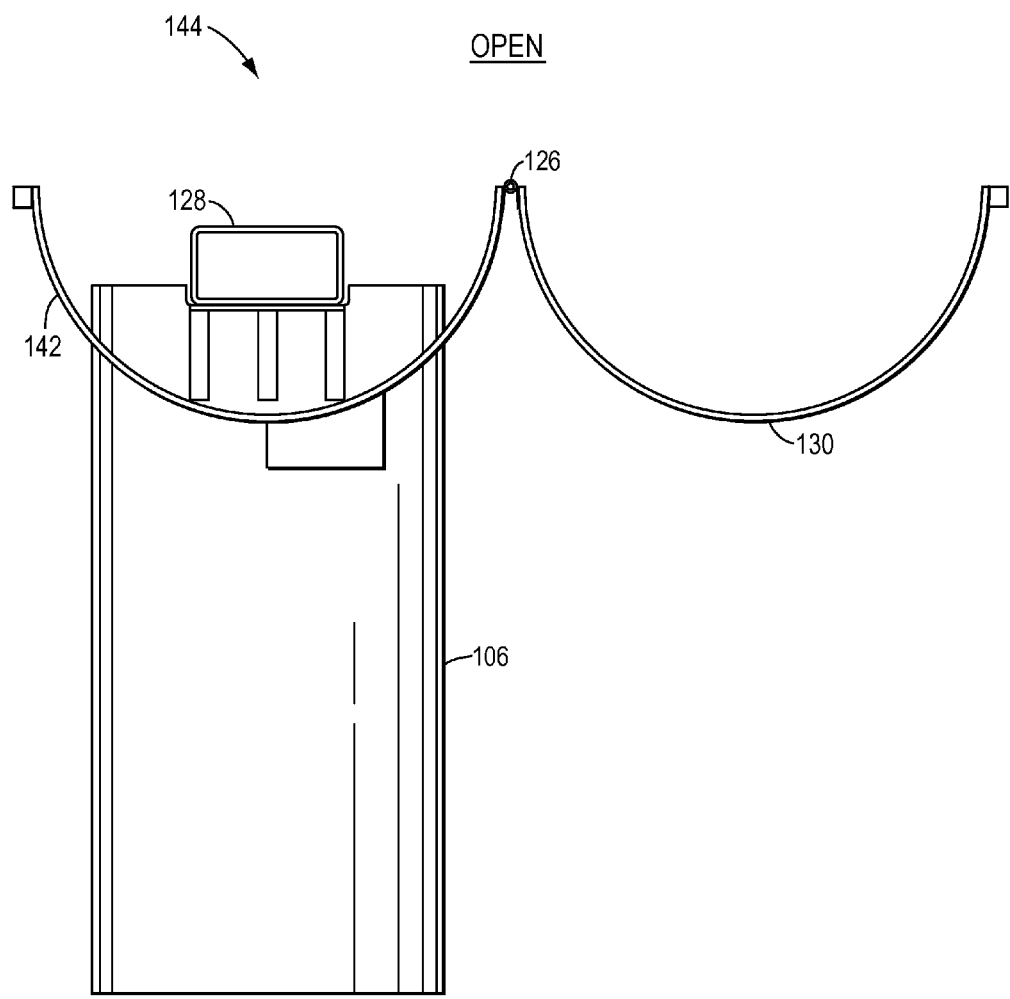

With reference to FIGS. 3-4B, the nacelle 144 can include an interior chamber having a cover portion 130 swingably mounted to form a closed housing when the cover 130 is swung to its closed position, as shown in FIG. 4A. The cover portion 130 can be hingedly attached to a bottom portion 142 such that the cover 130 may be swung around hinge 126 from the closed position (FIG. 4A) to an open position (FIGS. 3 and 4B) to facilitate access to the interior of the nacelle 144. The cover 130 can also be locked, for instance, by a locking device 124 to prevent access within the nacelle 144 during operation. The nacelle 144 may be located directly atop of the pole 106 (FIG. 3) and contain the generator components, such as shafts 136, bearings 116, bearing housing 128 (FIGS. 4A-4B), and electrical components 138, such electrical controls and wiring. As shown in FIG. 3, a pair of axle bearings 116 lies on opposite sides within the nacelle 144 onto a plane through the axle for supporting the rings for rotation when acted upon by the wind. The bearing housing 128 mounts the bearings 116 therein for rotation. In various embodiments, the wind turbine system 100 may include a control system for controlling and monitoring the operating parameters of and electrical output from each generator component.

A pair of counter rotates generators 132a and 132b, such as that illustrated in FIG. 3, is provided within the housing 104 to create a natural balance of torque on pole 106. In other words, two rotating rings spin one generator shaft such that if the torque produced by one of the rotating rings is greater than the second rotating ring, the extra torque does not apply to the system's output. This produces a natural balance which when coupled with another opposing generator ring pair will balance the total torque on pole 106. This configuration eliminates the z-torque on the pole 106 itself when both generator ring pairs are producing the same output. Even when both generators 132a and 132b are not producing the same output, the z-torque on pole 106 is greatly reduced due to the counter rotation.

To further illustrate the counter rotation according to an exemplary four ring design (as shown in FIGS. 1 and 3), within the first pair of the rotating rings, one ring spins on the shaft of a first generator and the other ring spins on the first generator itself. For the second pair of rotating rings, the same configuration is provided on the opposite side of the nacelle 144. Namely for both pairs of rotating rings, each generator 132a and 132b spins in the opposite direction as the respective shaft of the generator spins.

For example, in a four ring system as depicted in FIGS. 1 and 3, a first rotating ring 102d spins the shaft 134b of a first generator 132a, and a second rotating ring 102c spins the first generator 132a itself in the opposite direction. Positioned on the opposite side of the nacelle 144, a third rotating ring 102b spins a second generator 132b, and a fourth rotating ring 102a spins the second generator shaft 132b. According to this example, if the first rotating ring and the second rotating ring are both spinning at 50 RPM, then the effect is the same of a fixed generator spinning at 100 RPM. By providing a wind turbine having two sets of counter rotating rings, both set of rings are connected to the hub and are operable to rotate the stator and rotor thereof in opposite directions relative to one another, thereby doubling their relative speed. Thus, the counter rotating generator requires only approximately one-half of the wind speed to produce the same electricity as needed by a standard generator.

Like traditional wind turbines, the design of wind turbine 100 captures the wind via rotating rings 102a, 102b, 102c, and 102d that turns generator units 132a and 132b, which are located at the center or hub of the rotating rings. The power produced by each generator is proportional to the wind velocity, swept area, and air density as expressed by the following equation (Power=0.5×Swept Area×Air Density×Velocity$^3$).

Unlike traditional wind turbines, the wind turbine system 100 of the present teachings counter rotates the generator itself by mounting the generator onto a shaft. In order to counter rotate the generator, an extra set of rotating rings is installed to the generator housing. In order to balance the weight and provide a uniform design a second set of rotating rings is attached on an opposing side of the nacelle 144. This uniform configuration creates, for example, a total of four rotating rings 102a, 102b, 102c, and 102d counter rotating two generators 132a and 132b on top of a single pole 106, as shown in FIG. 1. Although a four rotating ring uniform design configuration is depicted in FIG. 1, it should be understood that the four-ring uniform design shown and described with reference to FIG. 1 is nonlimiting and exemplary only. Those skilled in the art would understand that various uniform configurations may be envisioned for the wind turbine system without departing from the scope of the present teachings. Moreover, configurations of the airfoil profile and number of rotating rings may be selected so as to generate the desired electricity based on the wind characteristics at a specific location.

Within the uniform counter-rotating generator design configuration according to the present teaching, in reference to the four ring system example depicted in FIGS. 1 and 3, a first rotating ring 102a spins on the shaft 134a of the generator at a hub-shaft bearing 141a, and a second rotating ring 102b spins on generator 132b at a hub-generator bearing 143a. Similarly, a third rotating ring 102d spins on the shaft 134b of the generator at hub-shaft bearing 141b, and a fourth rotating ring 102c spins on generator 132a at a hub-generator bearing 143b.

The basic configuration for each of the rotating rings 102a, 102b, 102c, and 102d is the same; therefore, the basic configuration for the rotating rings will be described generally in reference to the exemplary ring 102 in FIGS. 5A-5B. Each rotating ring 102 may include an exterior rim 110 and an interior rim 112. The interior rim 112 is connected to the hub of the housing 104 by several pairs of spokes 114 under tension using suitable fasteners 122 such as, for example, screws or nut and bolt arrangements.

The spoke pair connection to the hub is best shown in FIGS. 1-3, wherein spoke pairs 114 of rotating rings 102a are positioned to connect to the hub at the hub-shaft bearing 141a, and spoke pairs 114 of rotating rings 102d are positioned to connect to the hub-shaft bearing 141b. Spoke pairs 114 of rotating rings 102b are positioned to connect to the hub at the hub-generator bearing 143a, and spoke pairs 114 of rotating rings 102c are positioned to connect to the hub at the hub-generator bearing 143b.

Figure 5A:
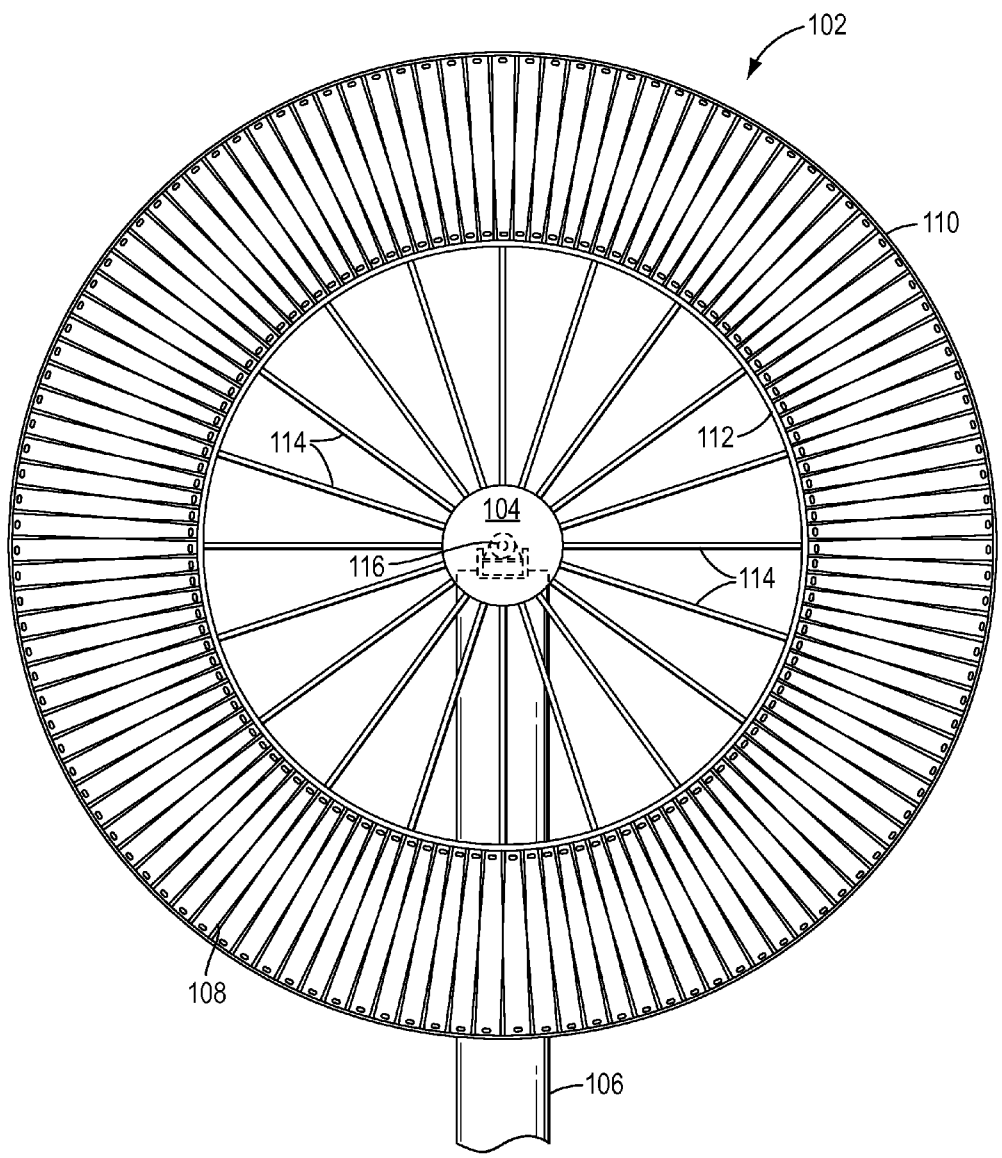
FIG. 5A is a front view of an exemplary embodiment of a rotating ring of FIGS. 1-2.

In FIGS. 5A-5B, a plurality of spaced-apart airfoils 108 are mounted between the exterior rim 110 and the interior rim 112 of the rotating rings. The plurality of airfoils 108 can be configured having an upper end and a lower end that are pivotally secured to the exterior rim 110 and the interior rim 112, respectively. The airfoils 108 are located approximately on the outside 20%-30% of the diameter of each rotating ring 102. In the preferred embodiments, the airfoils 108 are located approximately on the outside 25% of the diameter of each rotating ring. The spokes 114 are located on the inside 75% of the diameter of each rotating ring. This configuration maximizes the torque produced on the hubs 145a and 145b while minimizing the total weight of the system as well as reduces the total system wind speed.

By using airfoils, the wind turbine system of the present teachings is easily customizable to different wind characteristics at various locations. The airfoils 108 enable the system to be customizable based on the wind characteristics at a location by making slight design changes to the shape of the airfoil, which will in turn affect the lift. Different site locations selected for generating energy may experience different wind speed and direction therefore needing different shaped airfoils to generate energy in the most efficient manner. How the wind speed and wind direction are distributed at a particular location can be affected by a number of factors and situations, such as the pressure gradient, jet stream, latitude, local geography, and local weather conditions. For example, the pressure gradient is the difference in air pressure between two points in the atmosphere or on the surface of the Earth. It is vital to wind speed, because the greater the difference in pressure, the faster the wind flows (from the high to low pressure) to balance out the variation. The pressure gradient also influences wind direction. Thus, some site locations are exposed to stronger wind speeds with different wind patterns than other locations. Therefore, wind turbine system 100 can be configured having several differing interchangeable airfoils 108 with differing aerodynamic profiles, structures or geometries that can be installed into the system to efficiently generate energy at different locations. The same device can be used to generate energy at a variety of locations having different wind characteristics.

Thus, according to the present teaching, by changing its shape or profile, the airfoil may be configured in many different shapes, depending on the purpose for which it is intended. Certain airfoil shapes may be chosen in order to reduce the lift and allow a greater overall speed, to increase lift to slow down the rotating rings 102, or to react to different types of wind patterns. For example, some of the suitable airfoil designs may be symmetric, with a round curve on both sides. Some of the suitable airfoil shapes may be rounded on one end curving down to a point. Others suitable designs may be much sharper in shape.

Referring back to FIGS. 5A-6B, the rotating rings 102 include airfoils 108, which are evenly spaced between the exterior rim 110 and the interior rim 112. It should be understood that the number of airfoils 108 may be varied. The determination of the number of airfoils may also involve design considerations of aerodynamic efficiency, component costs, system reliability, and aesthetics. For example, the rotating rings may include from 10 to 50 airfoils.

Figure 6:
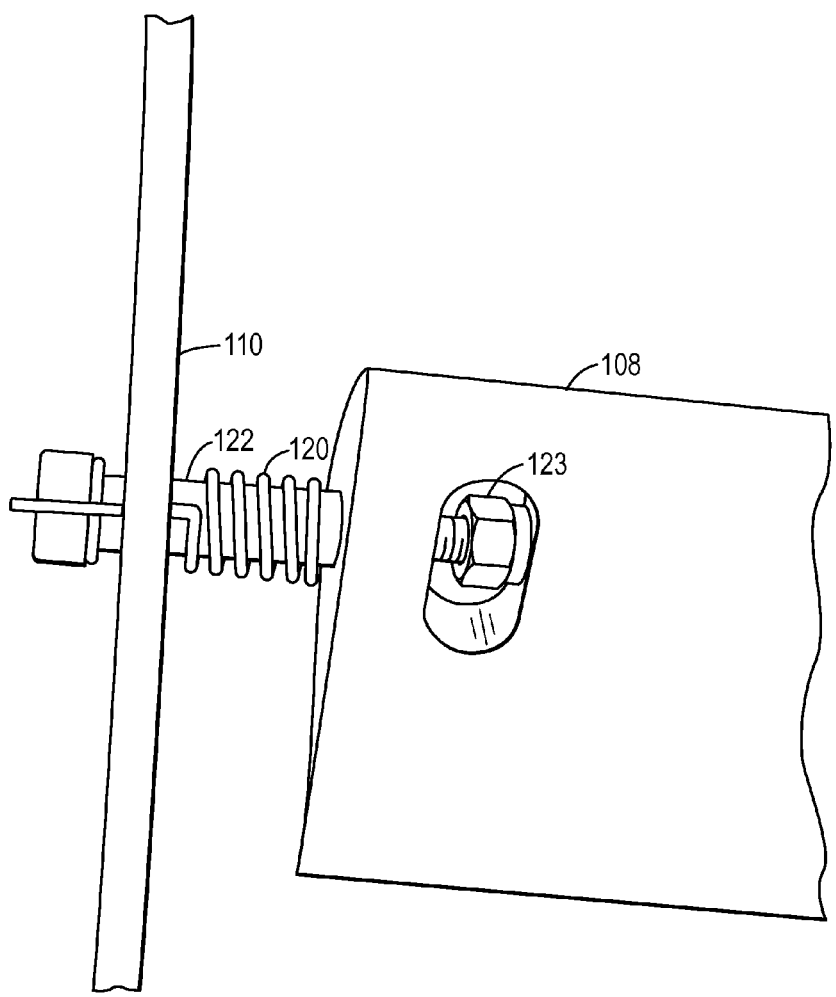
FIG. 6 depicts an attachment mechanism for an airfoil in accordance with the present teachings.
Figure 7A:
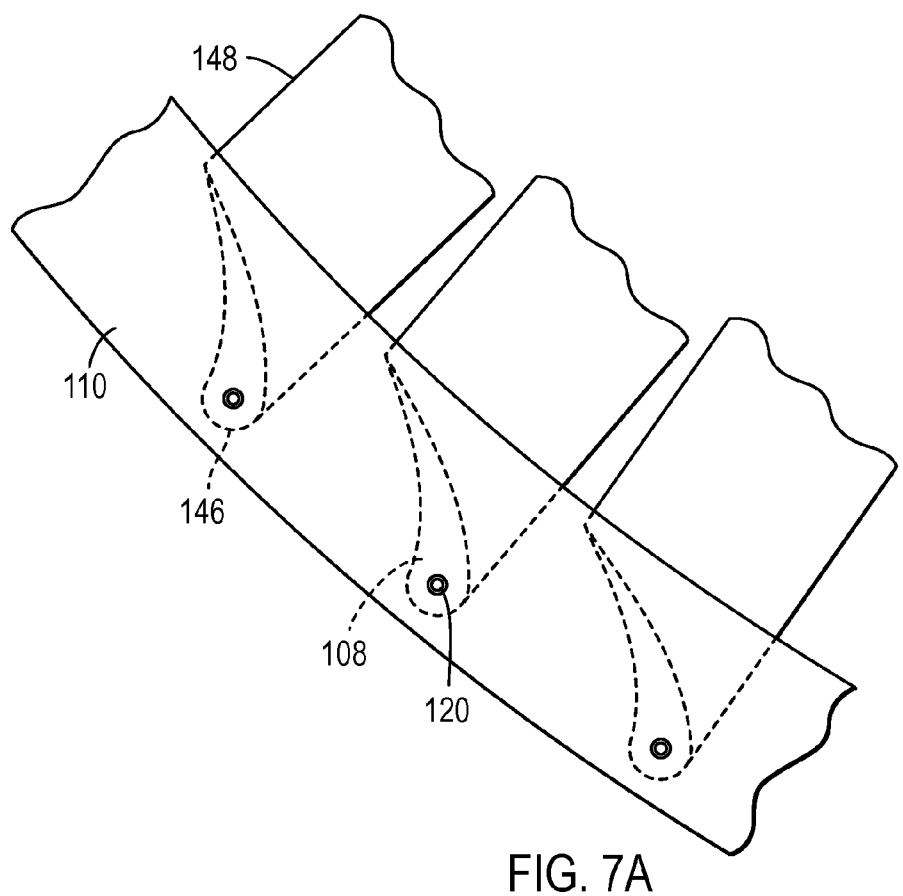
FIG. 7A illustrates a perspective of an airfoil in an initial rest position in accordance with an embodiment of the present teachings.
Figure 7B:
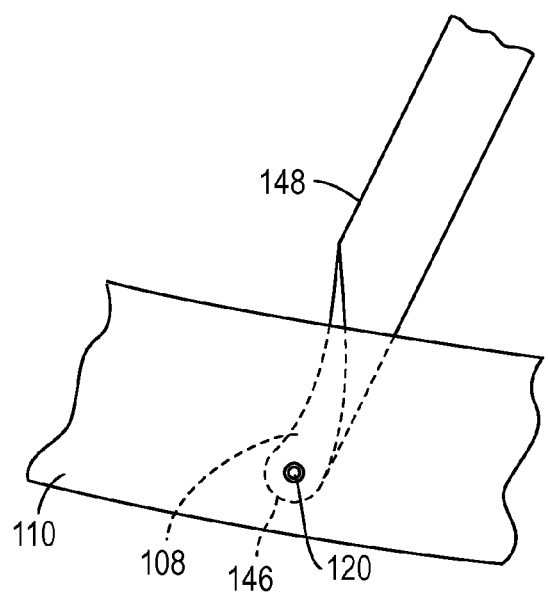
FIG. 7B illustrates a perspective of an airfoil in an open position in accordance with an embodiment of the present teachings.

Further, airfoil 108 may be designed with aerodynamic profiles so as to optimize energy transfer from the wind to the rotating rings 102. According to the present teachings, the airfoil design is customizable to maximize the lift created at low wind speeds, and dump the wind at high speeds. To dump wind is to allow wind to pass through an airfoil without producing any additional lift. This is achieved by spring loading the airfoils 108 to change the angle of attack as the wind speed increases. FIGS. 6-7B depict an exemplary embodiment of a spring-loaded airfoil 108 having a variable angle of attack. In FIG. 6, the spring-loaded airfoil 108 can include a spring 120 adapted to encircle rod 122, which is configured to be received within airfoil 108. The airfoil 108 may include a nut 123 carried by the threaded portion of the rod 122 for adjusting tension of the spring 120. Each airfoil 108 is able to pivot on rod 122 relative to the interior rim 122 and the exterior rim 110. The spring 120 or other resistance producing device may bias the airfoil 108 in an initial position or resting position. The spring 120 may be formed so that airfoil 108 opens or move as the wind speed increases. For example, the airfoil may move from a 30 degree wind angle to a 90 degree wind angle as the speed of wind increases from 0 mile per hour to 30 miles per hour.

According to the present teachings, airfoils can be adjusted by making slight changes to the shape of airfoil and/or the angle of attack, which in turn affects the lift. Although FIGS. 7A-7B illustrate a sample shape of the airfoil selected for use with certain wind and site conditions, those skilled in the art would recognize that alternative shapes may produce different lifts can be used. By way of example only, the design of the airfoils 108, in some embodiments, as shown in FIGS. 7A-7B, may be configured having a leading edge 146 and a trailing edge 148 and having a cross section resembling, for example, a tear drop. The leading edge 146 is the point at the front of the airfoil that has maximum curvature. The trailing edge 148 is defined as the point of maximum curvature at the rear of the airfoil. The leading edge 146 of each airfoil is arcuate and has a greater thickness than the trailing edge 148 of the airfoil. The chord line (not shown) is a straight line connecting the leading and trailing edges of the airfoil. The angle of attack (not shown) is the angle between the chord line of the airfoil and the vector representing the relative motion between the airfoil and the oncoming wind.

The angle of attack for each airfoil 108 can be customizable, for example, by adjusting the spring constant based on known wind conditions of a location. Depending on the direction of rotation (either clockwise or counter-clockwise), the angle of attack will either increase or decrease. For example, if the ring is spinning clockwise, the angle of attack range will be approximately 30 degrees at rest and approximately 90 degrees at high wind. For example, if the ring is spinning counter-clockwise, the angle of attack would be approximately 150 degrees at rest and approximately 90 degrees at high wind. Thus, one of the customizable features of the present teaching is the determination as to where to set the angle of attack at rest. Changing the angle of attack at rest affects the moment of inertia, which, as a result, affects the characteristics of the turbine. While suitable airfoils may include commercially available airfoils, the airfoils may be configured with a wind attack angle between 20 degree and 45, which may offer more efficient operation at low wind speeds and with a wind attack angle between 85 degree and 90 degree, which may offer more operation at high wind speeds. It should be understood that the airfoil design selection and attack angle can be varied for a given wind turbine size and wind speed operating regime.

FIG. 7A illustrates the airfoil in a closed position 108 when the rings 102 are at an initial rest or in a starting position. FIG. 7B illustrates the airfoil 108 in a fully open position as wind impinges on the airfoil during a high wind event. As the wind hits the airfoil 108, the airfoils 108 are rotatable between the initial closed starting position (FIG. 7A) to the fully open position (FIG. 7B), as will be described below.

With the spring-loaded airfoil design of the present teaching, as illustrated in FIG. 6-7B, there is no need for electronic devices to shut down the turbine during high wind events. When a high wind event occurs, the spring-loaded airfoils 108 will open which will have the effect of not increasing the RPMs in order to prevent the generator from over rotating. In contrast, most conventional wind turbines shut down during high wind events.

The spring-loaded airfoil design functions as a customizable braking system based on the site-specific wind conditions. The wind turbine system 100 is customizable based on the wind characteristics of the wind available at any site, the shape of the airfoil, and the spring constant to be a braking system in order to maximize the kilowatt output while protecting the electrical equipment. For example, the spring constant may be adjusted to customize the spring based on the known wind conditions and patterns of a specific location. Thus, the spring-loaded airfoil 108 provides a variable angle of attack, which changes as the wind speed increases. The variable angle of attack enables the system to be configured to properly select and size the generator and/or inverter to generate energy to a utility system.

By locating the airfoils 108 on approximately on the outside 25% of the diameter of the rotating rings 102 (FIGS. 1-2 and 5A-5B), during operation, as the wind speed initially increases, the wind completely passes through the inner 75% of the spokes of the rotating rings 102 and at the outside 25% the wind strikes at an angle of attack to rotate the rings 102. However, during high wind speeds, the spring-loaded airfoils 108 will "open" to also allow the wind to pass through the rotating ring 102, which will have the effect of not increasing the revolutions per minutes (RPMs). Thus, there is no need for the installation of an electronic braking system, because the wind turbine will reach a maximum RPM when the spring-loaded airfoils open at high wind speeds.

The maximum RPM for an airfoil can vary based on several factors, such as, for example, the profile of the airfoil, the spring constant, and the site-specific wind conditions. Thus, based on the wind characteristics of the location, the same wind turbine system in accordance with the present teachings may have the ability to use a variety of differing components so as to generate efficient energy production.

Initially when the rotating rings 102 are not rotating, the angle of attack is 30 degrees. When using the system 100 for generating electricity, operation of the dual counter rotating generators 132a and 132b will begin. As previously described and as best shown in FIGS. 1-2, the airfoils for the pair of rotating rings for each counter rotating generator are mounted in opposing directions with differing angles of attack. FIGS. 1-3 show the first generator 132a wherein the airfoil 108c captures the wind with an angle of attack and rotates ring 102c in the direction indicated by arrow A, and the airfoil 108d captures the wind with an angle of attack and rotates ring 102d in an opposite direction indicated by arrow B. Similarly, for the second generator 132b, the airfoil 108b captures the wind with an angle of attack and rotates ring 102b in the direction indicated by arrow A, and the airfoil 108a captures the wind with an angle of attack and rotates ring 102a in an opposite direction indicated by arrow B. The counter rotation of the generators 132a and 132b is caused by the relative movement between wind and the airfoils of rotating rings. As is commonly known, this produces an electrical current which is transmitted through the electrical wires 138.

As wind impinges on the airfoils 108, the rings 102 begin to rotate eventually reaching a desired RPM. As the rings 102 begin to rotate, the airfoils 108 are forced radially outward, because of the spring-loaded 120 connection, thereby changing the angle of attack. Thus, the angle of attack of the airfoils varies with the speed of the wind incident on the airfoils 108. Rotation of the airfoils 108 about rod 122 under the tension of spring 120 changes the angle of attack of the airfoil, thereby changing the lift and drag characteristics. Thus, the wind turbine system is capable of dynamically adjusting the angle of attack of the airfoils responsive to the wind speed. In this manner, the rotational speed of the airfoil dynamically adjusts to the wind speed to maintain the rotational speed within a desired RPM range based on the site-specific location. This maximizes the system's efficiency.

When the wind speed further increases during a high wind event, the maximum RPM may be reached such that the spring-loaded airfoils will open (FIG. 7B) and allow the wind to completely pass through both the 25% diameter of the airfoils and the 75% diameters of the spokes of the rotating rings, without interruption. When this occurs, the airfoil 108 will have pivoted to a completely open position at a 90° angle relative to the shaft at high wind as shown in the FIG. 7B and the spring 120 is stretched to its maximum length. The spring 120 is configured to prevent possible breaking in a high wind event, because the spring constant is selected to be sufficiently strong to resist the ordinary wind pressure of the site location. When the wind ceases, the rings 102 may stop rotating and the airfoil 108 may attain the initial position, as shown in FIG. 7A.

Based on the foregoing description, the customizable spring-loaded airfoil design may be configured to regulate the rotational speed of the rotating rings 102 thereof with varying wind conditions and speeds. This provides a wind turbine system capable of producing optimum energy output even with varying wind conditions and speeds.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. A wind turbine comprising:
a first rotating ring having a first interior rim and a first exterior rim;
a first plurality of airfoils pivotally secured between the first interior rim and the first exterior rim and disposed at a first angle of attack;
a second rotating ring having a second interior rim and a second exterior rim;
a second plurality of airfoils pivotally secured between the second interior rim and the second exterior rim and disposed at a second angle of attack;
a generator mounted between the first rotating ring and the second rotating ring and generating electricity in response to the first plurality of airfoils capturing the wind with the first angle of attack such that the first rotating ring rotates in a first direction and the second plurality of airfoils capturing the wind with the second angle of attack such that the second rotating rings rotate in an opposite direction from the first rotating ring;
a plurality of first rotatable shafts rotatably supported for rotation about a plurality of first shaft axes;
a plurality of second rotatable shafts rotatably supported for rotation about a plurality of second shaft axes;
each of the first plurality of airfoils secured, respectively, to the plurality of first rotatable shafts;
each of the second plurality of airfoils secured, respectively, to the plurality of second rotatable shafts;
a first spring having one end connected to a first airfoil of the first plurality of airfoils and having another end connected to the first exterior rim for rotating the first airfoil about a first shaft axis of the plurality of shaft axes from a first position of the first airfoil to a second position of the first airfoil:
the first position of the first airfoil at first wind speeds is configured such that:
the first airfoil assumes a first initial rest or starting position having an initial angle of the first airfoil of approximately 30 degrees relative to the first shaft axis; and
the first spring is in an initial rest or starting spring position in first wind conditions;
the second position of the first airfoil at second wind speeds is configured such that:
the first airfoil assumes a first fully open position having a final angle of the first airfoil of approximately 90 degrees substantially perpendicular to an axis of rotation of the first exterior rim and the first interior rim to permit the wind to completely pass without interruption through both the first plurality of airfoils and a first plurality of spokes connected to the first rotating ring and, respectively, to the first plurality of airfoils; and
the first spring is in a fully extended position responsive to second wind conditions;
a second spring having one end connected to a second airfoil of the second plurality of airfoils and having another end connected to the second exterior rim for rotating the second airfoil about a second shaft axis of the plurality of second shaft axes from the first position of the second airfoil to a second position of the second airfoil:
the first position of the second airfoil at first wind speeds is configured such that:
the second airfoil assumes a second initial rest or starting position having an initial angle of the second airfoil of approximately 150 degrees relative to the second shaft axis; and
the second spring is in the initial rest or starting spring position in the first wind conditions;
the second position of the second airfoil at second wind speeds is configured such that:
the second airfoil assumes the fully open position having a final angle of the second airfoil of approximately 90 degrees substantially perpendicular to an axis of rotation of the second exterior rim and the second interior rim to permit the wind to completely pass without interruption through both the second plurality of airfoils and a second plurality of spokes connected to the second rotating ring and, respectively, to the second plurality of airfoils; and the second spring is in the fully extended position responsive to the second wind conditions.

2. The wind turbine according to claim 1, wherein the first rotating ring is mounted to a shaft of the generator and the second rotating ring is mounted to the generator.

3. The wind turbine according to claim 2, wherein the generator generates electricity in response to the first rotating ring spinning the shaft in a first direction and the second rotating ring spinning the generator in a direction opposite of the shaft.

4. The wind turbine according to claim 2, wherein the first rotating ring spins on the shaft of the generator at a hub-shaft bearing, and the second rotating ring spins on generator at a hub-generator bearing.

5. The wind turbine according to claim 1, wherein the generator is a counter rotating generator.

6. The wind turbine according to claim 1, wherein the first plurality of airfoils defines an outside diameter of the first rotating ring and the second plurality of airfoils define an outside diameter of the second rotating ring.

7. The wind turbine according to claim 1, wherein the first plurality of airfoils is located on an outside 25 percent diameter of said first rotating ring and the second plurality of airfoils is located on an outside 25 percent diameter of the second rotating ring.

8. The wind turbine according to claim 1, wherein the first plurality of airfoils is located on an outside 25 percent diameter of said first rotating ring and the second plurality of airfoils is located on an outside 25 percent diameter of the second rotating ring such that when the wind flow begins to rotate the first and the second rotating ring the wind impinges the outside 25 percent diameter of the first and second plurality of airfoils, and, when a second wind speed event occurs, the first and the second plurality of airfoils positioned at the outside 25 percent diameter rotate to an open position such that the wind flow passes the first and second plurality of airfoils without increasing revolutions per minutes of the first and second rotating rings.

9. The wind turbine according to claim 1, wherein at least one of the first plurality of airfoils comprises a variable first angle of attack and the second plurality of airfoils comprises a variable second angle of attack.

10. The wind turbine according to claim 1, wherein changes in wind forces on at least one of the first plurality of airfoils and the second plurality of airfoils varies at least one of the first angle of attack and the second angle of attack relative to existing wind conditions.

11. The wind turbine according to claim 1, wherein the first angle of attack of the first plurality of airfoils and the second angle of attack of the second plurality of airfoils are operative to generate lift and wherein the first angle of attack is a first angle at which existing wind strikes the first plurality of airfoils and the second angle of attack is a second angle at which the existing wind strikes the second plurality of airfoils.

12. The wind turbine according to claim 1, wherein at least one of the first plurality of airfoils and the second plurality of airfoils is configured to create a maximum lift at the first wind speeds and create a 0 degree lift at the second wind speeds.

13. The wind turbine according to claim 1, wherein, during the second wind speeds, the first plurality of airfoils and the second plurality of airfoils rotate to an open position such that no increase in revolutions per minutes is provided to the first rotating ring and the second rotating ring.

14. The wind turbine according to claim 1, wherein a configuration of at least one of the first plurality of airfoils and the second plurality of airfoils is selected based on wind conditions at a location.

15. The wind turbine according to claim 1, wherein at least one of the first plurality of airfoils and the second plurality of airfoils include a leading edge and a trailing edge to enable a profile of the at least one of the first plurality of airfoils and the second plurality of airfoils to be customized for different site-specific wind conditions.

16. The wind turbine according to claim 1, wherein at least one of the first plurality of airfoils and the second plurality of airfoils include a leading edge and a trailing edge to enable at least one of the first angle of attack and the second angle of attack to be customized for different site-specific wind conditions.

17. The wind turbine according to claim 1, wherein the first plurality of airfoils comprises at least one first spring-loaded airfoil configured such that the first spring encircles the first rotatable shaft to vary the first angle of attack for changing a first lift of at least one of the first plurality of airfoils, and the second plurality of airfoils comprises at least one second spring-loaded airfoil configured such that the second spring encircles the second rotatable shaft to vary the second angle of attack for changing a second lift of at least one of the second plurality of airfoils.

18. The wind turbine according to claim 1, wherein the first spring and the second spring are configured for allowing displacement of the first plurality of airfoils and the second plurality of airfoils, respectively, between a minimum angle of attack position and a maximum angle of attack position.

19. The wind turbine according to claim 1, wherein the first plurality of airfoils and the second plurality of airfoils comprise the first spring and the second spring, respectively, for actively controlling the first angle of attack and the second angle of attack relative to existing air flow conditions.

20. The wind turbine according to claim 1, further comprising at least one spring-loaded airfoil that enable a customizable braking system for the first rotating ring and the second rotating ring, wherein a configuration of the spring-loaded airfoils is selected based on site-specific wind conditions.

21. The wind turbine according to claim 20, wherein a spring constant of the at least one spring-loaded airfoil is selected based on the site-specific wind conditions.

22. The wind turbine according to claim 1, further comprising at least one spring-loaded airfoil for actively controlling at least one of the first angle of attack and the second angle of attack such that the at least one spring-loaded airfoil rotates to the fully open position during the second wind event, without need for intervention of an electronic braking device to shut down rotation of the first rotating ring and the second rotating ring during the second wind event.

23. A wind turbine comprising:
a housing coupled to a support structure, wherein the housing is divided into sections including a first hub, a second hub, and a nacelle interdisposed between the first hub and the second hub;
a plurality of rotating rings mounted to the housing and configured to provide uniform load distribution on the support structure, wherein:
at least one of a first pair of rotating rings rotatably mounted along the first hub and at least one of a second pair of rotating rings rotatably mounted along the second hub, wherein each of the at least one of the first pair rotating rings and the second pair of rotating rings includes a first rotating ring and a second rotating ring;
a first plurality of airfoils pivotally secured to the first rotating rings and disposed at a first angle of attack;
a second plurality of airfoils pivotally secured to the second rotating rings and disposed at a second angle of attack; and
a pair of generators mounted to the housing and configured to provide uniform load distribution on the support structure, wherein:
a first generator is mounted to the first hub between the at least one first pair of rotating rings and generates electricity in response to the first plurality of airfoils of the at least one first pair of rotating rings capturing the wind with the first angle of attack such that the first rotating ring of the at least one first pair of rotating rings rotate in a first direction and the second plurality of airfoils of the at least one first pair of the rotating rings capturing the wind with the second angle of attack such that the second rotating ring of the at least one first pair of the rotating rings rotate in an opposite direction from the first rotating ring of the first pair of rotating ring;
a second generator is mounted to the second hub between the at least one second pair or rotating rings and generates electricity in response to the first plurality of airfoils of the at least one second pair of rotating rings capturing the wind with the first angle of attack such that the first rotating ring of the at least one second pair of rotating rings rotate in the first direction and the second plurality of airfoils of the at least one second pair of the rotating rings capturing the wind with the second angle of attack such that the second rotating ring of the at least one second pair of the rotating rings rotate in the opposite direction from the first rotating ring of the second pair of rotating ring;
a plurality of first rotatable shafts rotatably supported for rotation about a plurality of first shaft axes;
a plurality of second rotatable shafts rotatably supported for rotation about a plurality of second shaft axes;
each of the first plurality of airfoils secured, respectively, to the plurality of first rotatable shafts;
each of the second plurality of airfoils secured, respectively, to the plurality of second rotatable shafts;
a first spring having one end connected to a first airfoil of the first plurality of airfoils and having another end connected to the first exterior rim for rotating the first airfoil about a first shaft axis of the plurality of shaft axes from a first position of the first airfoil to a second position of the first airfoil:
the first position of the first airfoil at first wind speeds is configured such that:
the first airfoil assumes a first initial rest or starting position having an initial angle of the first airfoil of approximately 30 degrees relative to the first shaft axis; and
the first spring is in an initial rest or starting spring position in first wind conditions;
the second position of the first airfoil at second wind speeds is configured such that:
the first airfoil assumes a first fully open position having a final angle of the first airfoil of approximately 90 degrees substantially perpendicular to an axis of rotation of the first exterior rim and the first interior rim to permit the wind to completely pass without interruption through both the first plurality of airfoils and a first plurality of spokes connected to the first rotating ring and, respectively, to the first plurality of airfoils; and
the first spring is in a fully extended position responsive to second wind conditions;
a second spring having one end connected to a second airfoil of the second plurality of airfoils and having another end connected to the second exterior rim for rotating the second airfoil about a second shaft axis of the plurality of second shaft axes from the first position of the second airfoil to a second position of the second airfoil:
the first position of the second airfoil at first wind speeds is configured such that:
the second airfoil assumes a second initial rest or starting position having an initial angle of the second airfoil of approximately 150 degrees relative to the second shaft axis; and
the second spring is in the initial rest or starting spring position in the first wind conditions;
the second position of the second airfoil at second wind speeds is configured such that:
the second airfoil assumes the fully open position having a final angle of the second airfoil of approximately 90 degrees substantially perpendicular to an axis of rotation of the second exterior rim and the second interior rim to permit the wind to completely pass without interruption through both the second plurality of airfoils and a second plurality of spokes connected to the second rotating ring and, respectively, to the second plurality of airfoils; and
the second spring is in the fully extended position responsive to the second wind conditions.

24. The wind turbine according to claim 23, wherein the first rotating rings of the first pair of the rotating rings is mounted to a shaft of the first generator and first rotating rings of the second pair of the rotating rings is mounted to a shaft of the second generator, the second rotating ring of the first pair of the rotating rings is mounted to the first generator, and the second rotating ring of the second pair of the rotating rings is mounted to the second generator.

25. The wind turbine according to claim 23, wherein the first generator generates electricity in response to the first rotating ring of the first pair of rotating ring spinning a shaft of the first generator in a first direction and the second rotating ring of the first pair of the rotating ring spinning the first generator in a direction opposite of the shaft of the first generator; and
wherein the second generator generates electricity in response to the first rotating ring of the second pair of rotating ring spinning a shaft of the second generator in the first direction and the second rotating ring of the second pair of the rotating ring spinning the second generator in the direction opposite of the shaft of the second generator.

26. The wind turbine according to claim 23, wherein the first rotating ring of the first pair of the rotating ring spins on a shaft of the first generator at a first hub-shaft bearing, and the second rotating ring of the second pair of the rotating ring spins on the first generator at a first hub-generator bearing; and
wherein the first rotating ring of the second pair of the rotating ring spins on a shaft of the second generator at a second hub-shaft bearing, and the second rotating ring of the second pair of the rotating ring spins on the second generator at a second hub-generator bearing.

27. The wind turbine according to claim 23, wherein the first generator is a first counter rotating generator and the second generator is a second counter rotating generator.

28. The wind turbine according to claim 23, wherein a total number of the plurality of rotating rings mounted to the housing comprises an even number and the plurality of rotating rings are positioned symmetrically on both sides of the nacelle; and
    wherein the total number of the generators mounted to the housing comprises an even number and the generators are positioned symmetrically on both sides of the nacelle, resulting in the uniform load distribution on the support structure.

29. The wind turbine according to claim 23, wherein the plurality of rotating rings is mounted to the housing such that the plurality rotating rings successively increases or decreases in size from a first end of the housing to an opposite end of the housing.

30. The wind turbine according to claim 23, wherein the first plurality of airfoils is located on an outside 25 percent diameter of said first rotating rings and the second plurality of airfoils is located on an outside 25 percent diameter of the second rotating rings.

31. The wind turbine according to claim 23, wherein the first plurality of airfoils is located on an outside 25 percent diameter of said first rotating rings and the second plurality of airfoils is located on an outside 25 percent diameter of the second rotating rings such that when the wind flow begins to rotate the first and the second rotating rings the wind impinges the outside 25 percent diameter of the first and second plurality of airfoils, and, when a high wind speed event occurs, the first and the second plurality of airfoils positioned at the outside 25 percent diameter rotate to an open position such that the wind flow passes the first and second plurality of airfoils without increasing revolutions per minutes of the first and second rotating rings.

32. The wind turbine according to claim 23, wherein changes in wind forces on at least one of the first plurality of airfoils and the second plurality of airfoils varies at least one of the first angle of attack and the second angle of attack relative to existing wind conditions.

33. The wind turbine according to claim 23, wherein the first angle of attack of the first plurality of airfoils and the second angle of attack of the second plurality of airfoils are operative to generate lift and wherein the first angle of attack is a first angle at which existing wind strikes the first plurality of airfoils and the second angle of attack is a second angle at which the existing wind strikes the second plurality of airfoils.

34. The wind turbine according to claim 23, wherein at least one of the first plurality of airfoils and the second plurality of airfoils is configured to create a maximum lift at the first wind speeds and create a 0 degree lift at the second wind speeds.

35. The wind turbine according to claim 23, wherein, during the second wind speeds, the first plurality of airfoils and the second plurality of airfoils rotate to an open position such that no increase in revolutions per minutes is provided to the first rotating rings and the second rotating rings.

36. The wind turbine according to claim 23, wherein a configuration of at least one of the first plurality of airfoils and the second plurality of airfoils is selected based on wind conditions at a location.

37. The wind turbine according to claim 23, wherein the first plurality of airfoils comprises at least one first spring-loaded airfoil configured such that the first spring encircles the first rotatable shaft to vary the first angle of attack for changing a first lift of at least one of the first plurality of airfoils, and the second plurality of airfoils comprises at least one second spring-loaded airfoil configured such that the second spring encircles the second rotatable shaft to vary the second angle of attack for changing a second lift of at least one of the second plurality of airfoils.

38. The wind turbine according to claim 23, wherein the first spring and the second spring are configured for allowing displacement of the first plurality of airfoils and the second plurality of airfoils, respectively, between a minimum angle of attack position and a maximum angle of attack position.

39. The wind turbine according to claim 23, further comprising at least one spring-loaded airfoil that enable a customizable braking system for the first rotating rings and the second rotating rings, wherein a configuration of the spring-loaded airfoils are selected based on site-specific wind conditions.

40. The wind turbine according to claim 39, wherein a spring constant of the at least one spring-loaded airfoil is selected based on the site-specific wind conditions.

41. The wind turbine according to claim 23, further comprising at least one spring-loaded airfoil for actively controlling at least one of the first angle of attack and the second angle of attack such that the at least one spring-loaded airfoil rotates to the fully open position during the high wind event, without need for intervention of an electronic braking device to shut down rotation of the first rotating rings and the second rotating rings during the high wind event.

42. A method of generating electricity with a wind turbine comprising:
    rotating a first rotating ring having a first interior rim and a first exterior rim, wherein a first plurality of airfoils is pivotally secured between the first interior rim and the first exterior rim and disposed at a first angle of attack;
    rotating a second rotating ring having a second interior rim and a second exterior rim, wherein a second plurality of airfoils is pivotally secured between the second interior rim and the second exterior rim and disposed at a second angle of attack; and
    generating electricity, using a generator mounted between the first rotating ring and the second rotating ring, in response to the first plurality of airfoils capturing the wind with the first angle of attack such that the first rotating ring rotates in a first direction and the second plurality of airfoils capturing the wind with the second angle of attack such that the second rotating rings rotate in an opposite direction from the first rotating ring;
    providing a plurality of first rotatable shafts rotatably that is supported for rotation about a plurality of first shaft axes;
    providing a plurality of second rotatable shafts rotatably that is supported for rotation about a plurality of second shaft axes;
    wherein each of the first plurality of airfoils is secured, respectively, to the plurality of first rotatable shafts;
    wherein each of the second plurality of airfoils is secured, respectively, to the plurality of second rotatable shafts;
    providing a first spring having one end connected to a first airfoil of the first plurality of airfoils and having another end connected to the first exterior rim for rotating the first airfoil about a first shaft axis of the plurality of shaft axes from a first position of the first airfoil to a second position of the first airfoil:

wherein the first position of the first airfoil at first wind speeds is configured such that:
  the first airfoil assumes a first initial rest or starting position having an initial angle of the first airfoil of approximately 30 degrees relative to the first shaft axis; and
  the first spring is in an initial rest or starting spring position in first wind conditions;
wherein the second position of the first airfoil at second wind speeds is configured such that:
  the first airfoil assumes a first fully open position having a final angle of the first airfoil of approximately 90 degrees substantially perpendicular to an axis of rotation of the first exterior rim and the first interior rim to permit the wind to completely pass without interruption through both the first plurality of airfoils and a first plurality of spokes connected to the first rotating ring and, respectively, to the first plurality of airfoils; and
  the first spring is in a fully extended position responsive to second wind conditions;
providing a second spring having one end connected to a second airfoil of the second plurality of airfoils and having another end connected to the second exterior rim for rotating the second airfoil about a second shaft axis of the plurality of second shaft axes from the first position of the second airfoil to a second position of the second airfoil:
wherein the first position of the second airfoil at first wind speeds is configured such that:
  the second airfoil assumes a second initial rest or starting position having an initial angle of the second airfoil of approximately 150 degrees relative to the second shaft axis; and
  the second spring is in the initial rest or starting spring position in the first wind conditions;
wherein the second position of the second airfoil at second wind speeds is configured such that:
  the second airfoil assumes the fully open position having a final angle of the second airfoil of approximately 90 degrees substantially perpendicular to an axis of rotation of the second exterior rim and the second interior rim to permit the wind to completely pass without interruption through both the second plurality of airfoils and a second plurality of spokes connected to the second rotating ring and, respectively, to the second plurality of airfoils; and
  the second spring is in the fully extended position responsive to the second wind conditions.

43. The method according to claim 42, wherein generating the electricity further comprises the first rotating ring spinning a shaft of the generator in a first direction and the second rotating ring spinning the generator in a direction opposite of the shaft of the generator.

44. The method according to claim 42, wherein generating the electricity further comprises the first rotating ring spins on a shaft of the generator at a hub-shaft bearing, and the second rotating ring spins on the generator at a hub-generator bearing.

45. The method according to claim 42, wherein generating the electricity further comprises that when the wind flow begins to rotate the first and the second rotating rings the wind impinges an outside 25 percent diameter of the first and second rotating rings, wherein the first and the second plurality of airfoils are positioned, and, when a second wind speed event occurs, the first and the second plurality of airfoils positioned at the outside 25 percent diameter rotate to an open position such that the wind flow passes the first and the second plurality of airfoils without increasing revolutions per minutes of the first and second rotating rings.

46. The method according to claim 42, further comprising operating the first angle of attack of the first plurality of airfoils and the second angle of attack of the second plurality of airfoils to generate lift and wherein the first angle of attack is a first angle at which existing wind strikes the first plurality of airfoils and the second angle of attack is a second angle at which the existing wind strikes the second plurality of airfoils.

47. The method according to claim 42, further comprising modifying at least one of the first plurality of airfoils and the second plurality of airfoils to create a maximum lift at the first wind speeds and create a 0 lift at the second wind speeds.

48. The method according to claim 42, further comprising, during the second wind speeds, rotating the first plurality of airfoils and the second plurality of airfoils to an open position such that no increase in revolutions per minutes is provided to the first rotating ring and the second rotating ring.

49. The method according to claim 42, further comprising selecting a configuration of at least one of the first plurality of airfoils and the second plurality of airfoils based on wind conditions at a location.

50. The method according to claim 42, wherein the first plurality of airfoils comprises at least one first spring-loaded airfoil configured such that the first spring encircles the first rotatable shaft to vary the first angle of attack for changing a first lift of at least one of the first plurality of airfoils, and the second plurality of airfoils comprises at least one second spring-loaded airfoil configured such that the second spring encircles the second rotatable shaft to vary the second angle of attack for changing a second lift of at least one of the second plurality of airfoils.

51. The method according to claim 42, further comprising controlling the first angle of attack and the second angle of attack relative to existing air flow conditions using the first plurality of airfoils comprising the first spring and the second plurality of airfoils comprising the second spring, respectively.

52. The method according to claim 42, further comprising selecting a configuration of at least one spring-loaded airfoil based on site-specific wind conditions to provide a customizable braking system for the first rotating ring and the second rotating ring.

53. The method according to claim 52, further comprising selecting a spring constant of the at least one spring-loaded airfoil based on the site-specific wind conditions.

54. The method according to claim 42, further comprising controlling by at least one spring-loaded airfoil at least one of the first angle of attack and the second angle of attack such that the at least one spring-loaded airfoil rotates to the fully open position during the second wind event, without need for intervention of an electronic braking device to shut down rotation of the first rotating ring and the second rotating ring during the second wind event.

* * * * *